United States Patent
Gadkaree et al.

(10) Patent No.: US 6,555,031 B2
(45) Date of Patent: Apr. 29, 2003

(54) PROCESS FOR PRODUCING SILICON CARBIDE BODIES

(75) Inventors: Kishor P. Gadkaree, Big Flats, NY (US); Joseph F. Mach, Lindley, NY (US); John L. Stempin, Beaver Dams, NY (US)

(73) Assignee: Corning Incorporated, Corning, NY (US)

( * ) Notice: Subject to any disclaimer, the term of this patent is extended or adjusted under 35 U.S.C. 154(b) by 0 days.

(21) Appl. No.: 09/817,411

(22) Filed: Mar. 26, 2001

(65) Prior Publication Data

US 2002/0011683 A1 Jan. 31, 2002

Related U.S. Application Data

(63) Continuation-in-part of application No. 09/598,008, filed on Jun. 19, 2000, now abandoned.

(51) Int. Cl.$^7$ .............................................. C01B 31/00
(52) U.S. Cl. ..................................... 264/29.7; 264/658
(58) Field of Search ............................... 264/29.7, 658, 264/44

(56) References Cited

U.S. PATENT DOCUMENTS

| | | |
|---|---|---|
| 4,004,934 A | 1/1977 | Prochazka |
| 4,124,667 A | 11/1978 | Coppola et al. |
| 4,183,213 A | 1/1980 | Rao |
| 4,230,651 A | 10/1980 | Rao |
| 4,233,256 A | 11/1980 | Ohnsorg |
| 4,444,894 A | 4/1984 | Shaver |
| 4,578,363 A | 3/1986 | Campos-Loriz |
| 4,777,152 A | 10/1988 | Tsukada |
| 4,788,018 A * | 11/1988 | Yamada et al. |
| 4,855,263 A | 8/1989 | Kawasaki et al. |
| 4,888,376 A | 12/1989 | Atwell et al. |
| 4,929,573 A | 5/1990 | Atwell et al. |
| 4,981,665 A | 1/1991 | Boecker et al. |
| 5,196,389 A | 3/1993 | Dubots |
| 5,217,930 A | 6/1993 | Dubots |
| 5,283,019 A | 2/1994 | Atwell et al. |
| 5,324,692 A * | 6/1994 | Benker et al. ................. 501/88 |
| 5,395,807 A | 3/1995 | Divakar et al. |
| 5,429,780 A | 7/1995 | Prin et al. |
| 5,449,654 A | 9/1995 | Prin et al. |
| 5,460,759 A | 10/1995 | Dubots |
| 5,474,587 A | 12/1995 | Dias et al. |
| 5,635,430 A | 6/1997 | Divakar et al. |
| 5,707,567 A | 1/1998 | Pfaff |
| 5,750,449 A | 5/1998 | Niihara et al. |
| 5,853,444 A | 12/1998 | Maier et al. |
| 5,902,429 A | 5/1999 | Apte et al. |
| 5,914,187 A | 6/1999 | Naruse et al. |
| 6,017,473 A | 1/2000 | Maier et al. |

* cited by examiner

*Primary Examiner*—Christopher A. Fiorilla
(74) *Attorney, Agent, or Firm*—Kees van der Sterre; Timothy M. Schaeberle

(57) ABSTRACT

A silicon carbide honeycomb body is made by shaping a plasticizable raw material batch mixture containing powdered silicon metal, a water soluble crosslinking thermoset resin, a powdered silicon-containing filler, a water soluble thermoplastic binder, and water into a green honeycomb body, and thereafter drying, curing and sintering the green body at a temperature sufficient to convert the green body to a porous silicon carbide sintered body.

19 Claims, 4 Drawing Sheets

PROCESS FOR PRODUCING SILICON CARBIDE BODIES

This application is a continuation-in-part of application Ser. No. 09/598,008, filed Jun. 19, 2000 now abandoned.

BACKGROUND OF THE INVENTION

1. Field of the Invention

The present invention relates to silicon carbide sintered bodies useful in the removal of diesel soot particles from the exhaust gas of diesel engines. The invention more particularly relates to a method for producing the silicon carbide sintered bodies, in which a raw material batch of a carbon precursor and silicon metal powder is combined with a water-soluble thermoplastic binder, an inorganic filler and optionally an organic fibrous filler.

2. Background and Discussion of the Related Art

Silicon carbide honeycomb structures are desirable for industrial and automotive applications. Silicon carbide honeycomb structures are particularly useful because of the very high surface area to volume ratio and the low-pressure drops associated with such structures in applications where high flow rate streams are to be treated. The high surface area allows for high loading levels and hence longer life in filtration applications. Furthermore, the high chemical inertness, very high refractoriness, high thermal conductivity and thermal cycling resistance make such SiC honeycombs particularly desirable for many high temperature filtration applications. These silicon carbide honeycomb structures are particularly useful in diesel particulate filtration for use in the removal of soot particles from the exhaust gas of diesel engines. Specifically, it is the very high thermal conductivity as well as the high heat capacity of the silicon carbide that functions to minimize hot-spots in the filters during regeneration, that makes SiC particularly useful in these diesel application.

In general, the method for forming such silicon carbide honeycomb structures involves fabrication via the formation of a green body of fine particulate material, which is thereafter sintered. The sintering is typically carried out at very high temperatures, normally greater than 2000° C., for long periods of time because of the diffusive processes involved. Standard methods described in the literature typically involve extruding powdered silicon carbide with a thermoplastic binder, followed by burning off of the binder and thereafter sintering of the powder; see, e.g., U.S. Pat. No. 5,914,187. The drawback of the sintering method described is that very high temperatures (in excess of 2000° C.) and long periods of "time at temperature" (6–10 hours) are needed for consolidation, making the process very expensive. Furthermore, large structures with uniform properties are difficult to form because the so-formed structure does not have sufficiently high strength after the binder is burned out (typically around 800° C.), so as to be handled during the typical industrial process.

U.S. Pat. No. 5,853,444 (Maier) discloses a method for the production of a porous permeable molded body made of silicon carbide. The method disclosed therein involves utilizing a starting powder comprised of silicon, or a mixture of silicon with portions of silicon carbide and/or carbon. The starting powder is thereafter combined with an organic binding agent capable of being coked. This starting powder/binder mixture is then molded, specifically extruded, into a green body that is then subjected to an inert-gas atmosphere coking treatment. The molded body produced in this manner is then heated in the presence of nitrogen, or an inert gas containing nitrogen, to such a temperature sufficient to cause the free silicon to be converted with the carbon in a reaction to form silicon carbide; i.e., a recrystallization firing performed at greater than 2000° C.

U.S. Pat. No. 5,707,567 (Pfaff) discloses a process for forming a self-sintered silicon carbide composite material. The particular steps for the formation involve mixing together an inert solvent and a raw material batch comprising the following: (1) about 50–90%, by weight silicon carbide; (2) about 5.0 to about 50% graphite particles coated with a carbon precursor; (3) about 2 to about 20% of sintering aids; and, (4) about 0.75 to about 15% by weight temporary filler. The method next involves drying the raw batch to evaporate the inert solvent and thereafter shaping the dried raw batch into a shaped body. After shaping the body into the desired shape, the method involves heating the shaped body at a temperature sufficient to carbonize the carbon precursor and volatilize the temporary filler thereby forming a matrix having interconnected pores; sufficient temperature disclosed for carbonizing the green body is 850° C. Lastly, the method for forming the self-sintered silicon carbide composite material involves sintering the shaped body to densify the matrix; sintering temperatures ranging from 1900 to 2500° C. are disclosed.

Both the Maier and Pfaff methods described are capable of use in forming silicon carbide bodies, however the disadvantage of using each of these methods is that, like most standard SiC sintering processes, they require extraordinarily high sintering temperatures, typically in excess of 2000° C. Additionally, the Maier method results in the formation of very fragile after-carbonization structures, due to the very low carbon content material (i.e. starch or modified starch) used as the binder. Although the Pfaff method is suited to forming a graphite-containing silicon carbide, it is not suitable for the formation of ceramic bodies useful in filtration applications. Lastly, the batches disclosed in the Pfaff reference are not suitable for use in the extrusion process required for the formation of honeycomb structures.

Various SiC formation methods have been utilized involving reduced sintering temperatures, in an attempt to reduce both the cost and complexity of forming silicon carbide structures.

U.S. Pat. No. 5,196,389 (Dubots) describes the formation of silicon carbide supports. The method involves forming a plasticizable mixture of silicon powder, resin and carbon powder. The mixture is thereafter shaped, preferably by extrusion, to form a green monolithic honeycomb structure suitable for use as the catalyst support. Heating of this green monolithic body in non-oxidizing atmosphere at a temperature of between 600 and 1000° C. is continued for a period of time sufficient to carbonize all of the resin in the mixture/green body. Lastly, the green monolithic honeycomb body is sintered, in a non-oxidizing (or nitriding) atmosphere, at temperature of between 1350 and 1450° C. for a period of between 1 to 2 hours.

Although the sintering temperature disclosed in this SiC formation method are reduced when compared to those temperatures used in reaction sintering methods such as the Maier and Pfaff methods, there are several drawbacks associated with this formation method. The type of resins disclosed in this Dubots reference exhibit such a sufficiently high viscosity that the resins require dilution in ethanol in order to allow them to mix with a high percentage of fine solid powders. This solvent must then be removed during the heating and curing of the resin and thereafter recycled, or more practically burned off; as such this disclosed process requires unnecessary complexity and cost.

Dubots discloses the use of carbon black as the major carbon source; i.e., very fine soot powders with high surface area. Typically, carbon does not bond to any binder very well, the result being that structures produced with carbon-based fillers are typically weak. Furthermore, when the carburetion is carried out at 1400° C., in order to form silicon carbide, the silicon powder has to melt and mix completely with the carbon. Discrete carbon particles make it difficult for this interaction to take place uniformly throughout the structure, thereby resulting in very small grained sintered SiC structures that are typically weak and non-uniform. Although the strength and uniformity of the structure may be sufficient for thick-walled catalyst support structures, this strength is not sufficient for thin-walled, controlled porosity honeycomb structures, where the efficiency of the filtration is controlled by the wall properties; i.e., diesel particulate filtration applications.

U.S. Pat. No. 5,217,930 (Dubots) discloses a porous refractory carbide with a skeleton of metal or metalloid refractory carbide for catalyst support. Particularly, the reference describes a method for the formation of silicon oxycarbide coated on metallic or SiC-type porous substrate. The method of forming this silicon oxycarbide material involves mixing an organic polymeric or polymerisable compound with metal powder and a solvent and thereafter curing the formed mass after removal the solvents. Heat treating at 500–1000° C. is then utilized for forming the porous skeleton; i.e., carbonization. After carbonization the structure is subjected to "activation" i.e., partial or controlled oxidation in presence of oxygen (500–900° C.). After oxidation, heat treatment, in inert atmosphere, is carried out at temperature not exceeding 1400° C., preferably 1150–1250° C., to form an amorphous SiOxCy compound, while part of the structure forms silicon carbide.

Although the sintering temperatures utilized in this method are reduced over those disclosed in the aforementioned processes, this method is not suitable for use in extruding thin-walled SiC honeycomb structures. Specifically, as was the case in the previous Dubots reference, the high viscosity of the resin utilized (e.g., as high as 4000 cp), results in a high degree of oligomer reaction, thereby rendering the resin sparingly, if at all, soluble in water. As a result of this, few reactive sites are available, and thus the resin cannot be diluted with water, thereby resulting in the severe splitting of walls, and in turn leading to the formation of weak silicon carbide honeycombs.

There is, accordingly, a clear need for, and thus an object of the present invention is to provide, for a reduced sintering temperature process suitable for use in the formation of extruded thin-walled honeycomb silicon carbide structures.

SUMMARY OF THE INVENTION

Accordingly, the object of the present invention is directed at both a raw material batch mixture and a process for forming green and lowered-temperature sintered SiC honeycomb structures that exhibit with sufficient handling and so-formed strength.

Specifically, the invention is directed at a plasticizable raw material batch mixture for forming a silicon carbide honeycomb structure, comprising the following components: (1) powdered silicon metal; (2) a carbon precursor comprising a water soluble crosslinking thermoset resin having a viscosity of less than about 1000 centipoise (cp), and preferably less than about 500 cp; (3) a powdered silicon-containing filler; and, (4) a water soluble thermoplastic binder. Optionally, the batch mixture can include either, or both, an organic fibrous filler and a pore forming filler comprising either a graphitic or a thermoplastic pore-forming filler.

In another aspect, the invention provides for a process for producing a silicon carbide honeycomb structure utilizing the inventive batch material. The process involves the following steps: (1) mixing together selected raw materials to form the previously mentioned plasticizable raw material batch; (2) shaping the batch mixture to form a shaped green body, preferably involving extrusion to form a honeycomb structure; (3) drying and curing the green body; (4) heating the green body in a nitrogen atmosphere at a temperature sufficient to carbonize the resin; and, (5) sintering the green body at a temperature sufficient to convert the green body to a porous silicon carbide sintered body; preferably a temperature at least above 1400° C.

DETAILED DESCRIPTION OF THE INVENTION

Figure 1:
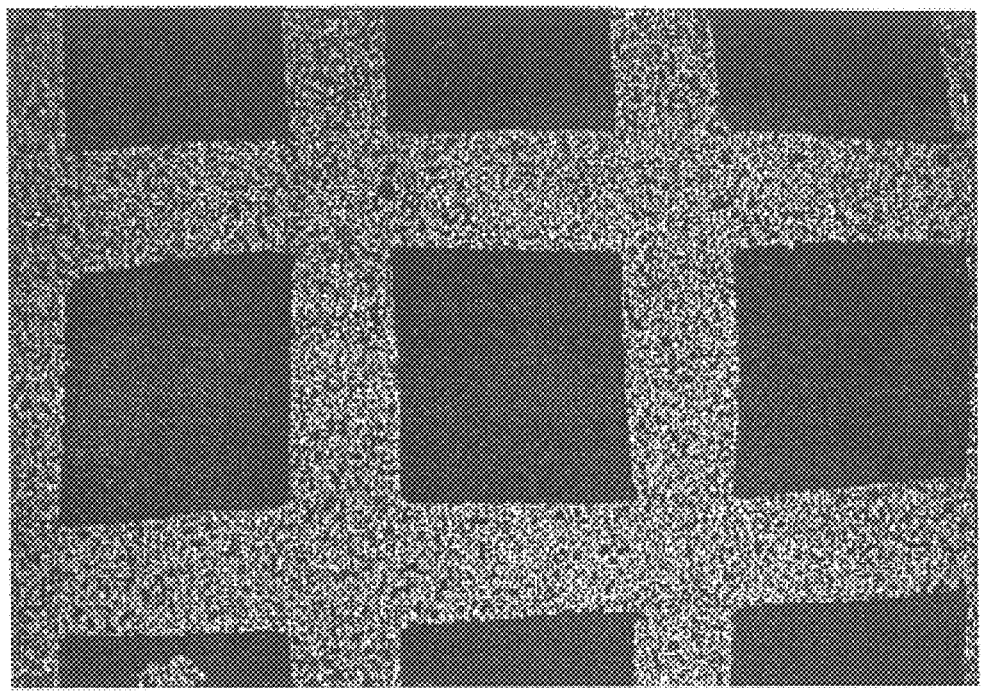
FIG. 1 is a scanning electromicrograph taken at 25×, of a sintered silicon carbide honeycomb structure formed according to the process disclosed in the instant invention.

This instant invention relates to a plasticizable batch mixture capable of being extruded into a silicon carbide green honeycomb body exhibiting surprisingly good strength; sufficient green strength to allow handling of the green honeycomb in a standard manufacturing process. Furthermore, this so-formed SiC honeycomb body formed from this inventive batch mixture can be dried, cured and sintered at temperatures as low as 1400° C. to form a sintered SiC honeycomb structure possessing good strength.

The extrudable batch mixture for use in preparing a sintered silicon carbide honeycomb substrate comprises about 10–40%, by weight, finely powdered silicon metal; preferably about 15–30%. The silicon powder should exhibit a small mean particle size; e.g., from about 0.2 micron to 50 microns, preferably 1–30 microns. The surface area of the silicon powder may, in some instances, be more descriptive than particle size, and should range between about 0.5 to 10 $m^2/g$, preferably between about 1.0–5.0 $m^2/g$.

It is preferred that the silicon powder be comprised of a crystalline silicon powder. It has been found that the use of amorphous silicon metal powder in the subsequent formation process, as is standard in the prior art, results in an aqueous system that typically is subject to a reaction, and resultant foaming, between the silicon and water which is used as the preferred solvent for the resin. This foaming is particularly undesirable when forming honeycomb, or similar-type filtration structures, as it makes it particularly difficult to form structures exhibiting controlled wall uniformity, porosity and microstructure; i.e., difficulty in forming ceramic bodies exhibiting the narrowed pore size distribution desired for filtration applications. It has been surprisingly found that the use of powdered crystalline silicon does not result in presence of foaming reactions when utilized in an aqueous system. As such, the use of crystalline silicon powder, in turn, allows use of water as the solvent and in the formation of an aqueous system. In short, the SiC formation process is much simpler, more economical, as water is an inexpensive solvent and requires no post formation handling or disposal of resultant water vapor.

The raw batch also contains about 10–40%, by weight, of a carbon precursor, specifically, a water soluble crosslinking thermoset resin having a viscosity of less than about 1000 centipoise (cp). It is necessary that the thermoset resin utilized also be a high carbon yield resin, and that it be utilized in an amount such that the resultant carbon to silicon ratio in the batch mixture is about 12:28 by weight; the stoichiometric ratio of Si—C needed for formation of silicon carbide. Acceptable water-soluble crosslinking thermoset resins include phenolic resins, such as Phenolic resole liquid resin available from Georgia Pacific commercially sold as code GP510D34 RESI-SET.

Viscosity is an important feature of the thermoset resin utilized in the raw batch. It has been discovered that resin systems, in addition to being water-soluble must have a viscosity below about 1000 centipoise (cp), and preferably between 300 to 500 cp; most preferably between 100 and 200 cp. Viscosities at these low levels allow the plasticized batch mixture to be extrudable in a variety of shapes, specifically honeycombs. Use of a thermoset resin exhibiting a viscosity greater than about 1000 cp results in extruded structures, such as honeycombs, that have a tendency to exhibit split walls, in spite of attempts to avoid this undesirable split wall feature by adding water to reduce the viscosity of the resin. Although not intending to be limited by theory, it is thought that the reason for this behavior is as follows. Phenolic resins are produced by a reaction of phenol and formaldehyde in a water solution while in the presence of an acid or base catalyst. As the reaction proceeds, oligomers are formed and the resin begins to precipitate. The longer the reaction is allowed to continue, the higher the oligomer molecular weight. Higher molecular weight oligomers have fewer reactive sites and lower water solubility. The viscosity of the resin thus indicates its oligomer reactivity and water solubility. Once the viscosity becomes very high, the resin completely precipitates out of the water. For a given process the viscosity of the phenolic resin is thus very critical, since it will determine the reactivity of the resin with components, it's capability to be diluted and still form strong structure on cure, as well as carbonization tendency. In this particular case where phenolic resin-containing honeycomb structures with fillers are preferably extruded, it is necessary to have the resin viscosity below the aforementioned level of 1000 cp.

One advantage of utilizing the liquid thermoset resin in the batch mixture is that it intimately mixes with silicon powder to ultimately form, upon curing and carbonization steps of the process to be described later, a homogeneously and intimately mixed carbon/silicon structure. As such, the reaction between carbon and silicon that takes place during sintering does so uniformly, thereby resulting in a uniform SiC sintered structure.

Powdered silicon-containing fillers, in an amount up to 60%, by weight, may also be included in the inventive batch mixture. The main function of these fillers is to prevent excessive shrinkage of the green body during the carbonization and reactive consolidation/sintering steps. Suitable silicon-containing fillers include silicon carbide, silicon nitride, mullite or other refractory materials. The preferred particle size for the fillers is a mean particle size of between 0.5–50 $\mu$m, and more preferably 5–30 $\mu$m. The surface area of the powders should be between 0.1 and 5m$^2$/g, and preferably 0.5–1.5m$^2$/g.

The batch may further optionally include up to about 15%, by weight, of an organic fibrous filler. Inclusion of this fibrous filler in the batch contributes to the formation of a good honeycomb structure. Suitable fibrous fillers include cotton fiber, cellulose fiber, wood fiber or crushed nut shells or other organic similar-type fibrous material, with cellulose fiber being the preferred filler. The cellulose fiber is easily wetted, is flexible and helps knit the structure of the wall. Suitable fibers exhibit a diameter of between 0.1–50 $\mu$m, and preferably 1–20 $\mu$m.

Lastly the batch mixture contains about 2–10%, by weight, of a water-soluble thermoplastic temporary binder. Acceptable temporary binders include methylcellulose, hydroxypropyl methylcellulose, and combinations thereof. Preferred sources of cellulose ethers and/or derivatives thereof, are Methocel A4M, F4M, and F240M from Dow Chemical Co. Methocel A4M is a methylcellulose binder having a gel temperature of 50–55° C. and gel strength of 5000 g/cm$^2$ (based on 2% solution at 65° C.). Methocel F4M and F240M are hydroxypropyl methylcellulose.

Optionally, the inventive batch may include a pore-forming filler in an amount of up to 20%, by weight, specifically an organic filler, which does not leave any carbon residue after firing; suitable pore-formed fillers include either a graphitic or thermoplastic pore-forming filler. Pore size and porosity amounts are important properties that must be controlled when forming a honeycomb structure for use in filtration applications. For applications such as diesel particulate filtration, for example, desired pore sizes range from 1–30 microns. FIG. 1 is an SEM of a formed SiC honeycomb wall section exhibiting the type/size of porosity that is desirable for diesel filtration applications. The utilization of pore forming fillers facilitates the formation of pores of desired size like that illustrated in FIG. 1. If a graphitic pore-forming filler is utilized in the batch mixture, the mean particle size and weight percent of graphite powder utilized determines the final porosity in the wall. It should be noted that the graphitic filler is not affected in any way during later-described cure, carbonization or reactive firing/sintering of the honeycomb structures. As such, any so-formed structure will require a post-sintering step to burn out graphite and leave porosity behind; e.g., the honeycombs can subjected to air firing at around 800° C. to burn out graphite. On the other hand, the use of a thermoplastic pore-forming filler will not require a post-sintering bum-out step as the filler bums out in nitrogen during the later-described carbonization with little or no carbon residue while still leaving behind the requisite porosity.

Optionally sintering aids such as boric oxide, aluminum oxide, silicon nitride, aluminum nitride, boron carbide, yttrium oxide or other rare earth oxides aluminum metal powders, as well as other standard sintering aids known in the art may be added to the batch.

Figure 2:
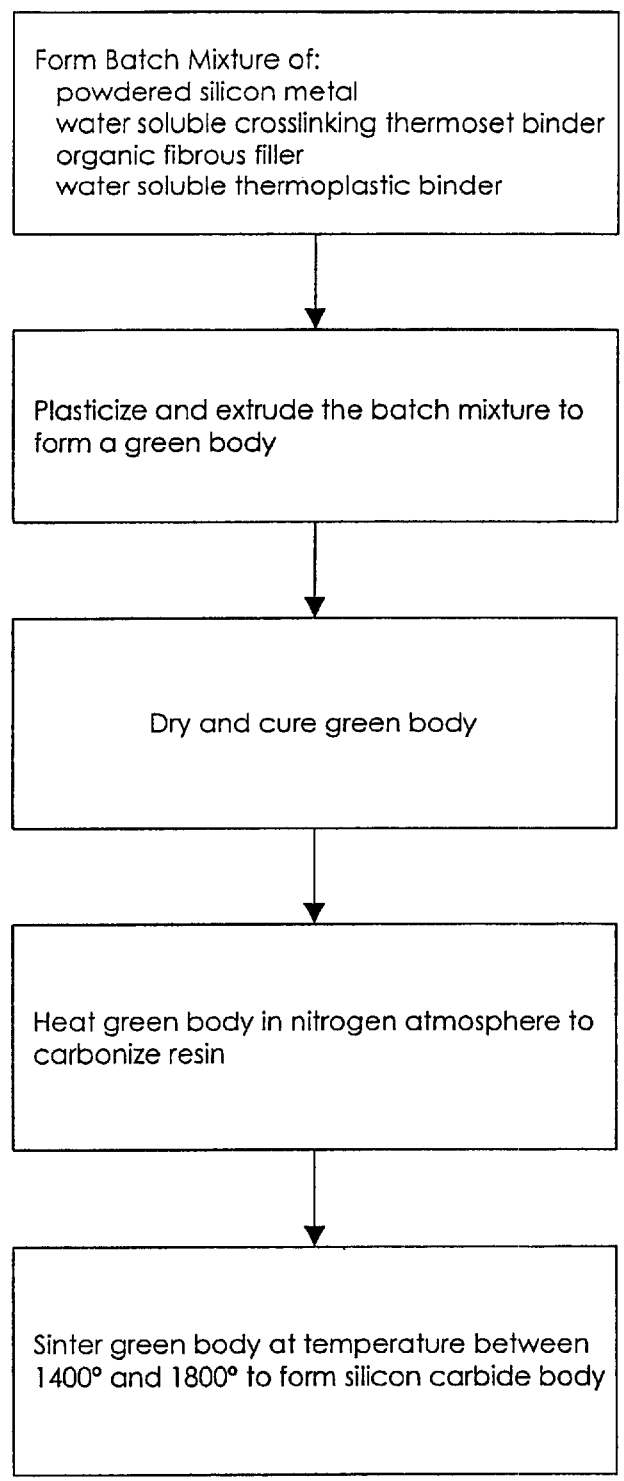
FIG. 2 is a schematic flow-chart illustration of the process for producing a sintered silicon carbide graph according to the instant invention.

Referring now to FIG. 2, illustrated therein is a schematic flow diagram listing the steps of the inventive process. The first step of the process involves mixing together the components of the aforementioned plasticizable raw batch. Specifically, the batch mixture should comprise the following: (a) about 10–40%, by weight, powdered silicon metal, preferably crystalline powdered silicon metal (b) about 10–40%, by weight, of a water-soluble crosslinking thermoset resin having a viscosity of less than about 1000 centipoise (cp); and, (c) about 2–10%, by weight of a water soluble thermoplastic temporary binder. As described above, the batch mixture can optionally include a surfactant, up to 60%, by weight, of powdered silicon-containing filler, up to about 15%, by weight, of an organic fibrous filler and a pore-forming filler comprising either a graphitic or a thermoplastic pore forming filler.

The mixing preferably takes place in three stages. In the first stage, the crystalline silicon metal powder is mixed with the required amount of the water-soluble resin. The second stage or wetting stage of batch formation, involves adding and dry mixing together the silicon metal powder-resin mixture and the remaining inorganic powder particles, i.e., the silicon containing powder filler, binder and optional surfactant, inorganic fibrous filler and pore forming filler, and thereafter adding the required amount of the solvent to form the wet batch. This mixing and solvent addition is done in a standard mixer, for example a Littleford mixer. The solvent, typically water, is added in an amount that is less than is needed to plasticize the batch; typically the water is added as a superaddition, in amounts ranging from 5–25%, by weight, with levels ranging from 7–15%, by weight being preferred. With water as the solvent, the water hydrates the binder and the powder particles. At this stage, the powder particles are coated and dispersed by the surfactant and solvent.

In a preferred embodiment, the plasticization takes place in the third stage. In this stage the wet mix from the second stage is sheared in any suitable mixer (e.g., Littleford) in which the batch will be plasticized. In other words, stirring together the powdered components, in a suitable known manner, to prepare an intimate mixture of the inventive batch mixture capable of being formed into a SiC sintered body by, for example, by extrusion or molding.

Following plasticization, the resulting stiff, uniform and extrudable batch mixture is then shaped into a green body by any known conventional ceramic forming process, such as, e.g., extrusion, injection molding, slip casting, centrifugal casting, pressure casting, dry pressing, etc. For the preparation of a thin-walled honeycomb substrate suitable for use in diesel filtration applications, extrusion through a die is preferable.

Once the batch mixture is plasticized and thereafter shaped into, for example a honeycomb structure, the so-formed structure is then dried and cured by one of a variety of conventional techniques known to those skilled in the art, e.g., hot-air heating, microwave heating, and dielectric heating. Preferably, the green honeycomb structures are dried and cured for a period of 1 hour at temperatures of up between 90 to 150° C. The resultant strength of these green, cured structures typically exceeds 10 ksi, though 5 ksi is sufficient.

The very strong green structures are then fired in nitrogen at temperatures of between 700–1000° C. to carbonize the resin and to remove pore-forming fillers. The green structure should be fired for a sufficient period of time so as to complete the reaction of the metal and carbon to form silicon carbide. The carbonized structures are then fired at a temperature sufficient to complete the conversion to silicon carbide porous honeycombs; i.e., very strong monolithic structures of silicon carbide exhibiting crush strengths in excess of 10 ksi.

Preferably, the firing is temperature range is between 1400 to about 1800° C.; the resultant crystalline phase obtained by utilizing this firing temperature range is cubic silicon carbide. It is noted that, optionally the firing can be done at higher temperatures, up to 2400° C., if formation of the hexagonal or rhombic crystalline type of silicon carbide is desired.

The firing step can be carried out in a conventional batch or continuous furnace, wherein the shaped body is passed through the hot zone of the furnace at a rate to provide a prescribed residence time at the desired temperature. The firing step accomplishes a "pressureless sintering" referred to herein simply as "sintering". By "sintering" or "pressureless sintering" it is meant that no mechanical pressure is applied to the object being fired or sintered to promote densification. Instead the object being sintered, usually in an inert container such as a graphite crucible, is maintained under an atmosphere of inert gas, a vacuum, or nitrogen; inert gasses include argon, helium and neon. The gasses in which the sintering operation can be carried out thus include argon, carbon dioxide, carbon monoxide, helium, hydrogen, neon, and nitrogen and mixtures thereof. Although nitrogen, under sintering conditions, enters into, to some degree, the silicon carbide, it does so in sufficiently minor degree that the composition of the sintered ceramic body is not noticeably changed. The firing can also be carried out under vacuum. By vacuum it is meant a practical vacuum of 1.0 torr or less.

The advantages of utilizing the inventive method of forming SiC structures when compared to those prior art methods, those involving the mixing and extruding of silicon carbide powders with binders and firing to obtain structures, include: (1) The silicon carbide honeycombs are typically fabricated at significantly lowers temperature, as low as 1400° C. compared to temperatures of as great as between 2200–2400° C. utilized in prior art processes, the result being a substantial reduction in both energy requirements and equipment cost; (2) Typical firing times are much shorter—only 1 hour at 1500° C. compared to many hours needed at temperatures ranging between 2200 to 2400° C. for diffusive sintering needed in prior art methods, as such a much more economical process; (3) Large structures, e.g., honeycomb bodies, may easily be made at room temperature and rigidified at temperatures of about 150° C., thereby allowing very easy handling during processing, which is due to the fact that in the instant method strong green structures are formed due to crosslinked resin; (4) Structures comprised of 100% silicon carbide may be formed without the utilization of any sintering aids, thereby allowing a full utilization of silicon carbide properties.

It is contemplated that the above silicon carbide formation principles apply equally well to the formation of titanium carbide, boron carbide and, aluminum carbide wherein powdered titanium, boron or aluminum, respectively, is substituted for powdered silicon.

EXAMPLES

To further illustrate the principles of the invention of the present invention, there will be described certain examples of silicon carbide structures formed according to the invention, as well as a number of comparative formation examples. However, it is to be understood that the examples are given for illustrative purpose only, and the invention is not limited thereto, but various modifications and changes may be made in the invention, without departing from the spirit of the invention.

Example 1

A plasticizable raw material batch mixture containing the following raw materials was mixed and mulled together with a 7%, by weight, superaddition of water:

| Component | Weight Percent |
|---|---|
| Powdered crystalline silicon-4.9 μm* (Alpha Aesar, Ward Hill, Ma) | 23.699 |
| Phenolic resole liquid resin-137 cp** (Georgia Pacific); | 25.393 |
| Silicon carbide powder-0.6 μm* (Superior Graphite, Chicago, Ill) | 35.00 |
| BH40 cotton fiber filler | 8.9075 |
| Methylcellulose binder (Methocel A4M, Dow Chemical, Midland, MI) | 6.00 |
| SAN Lubricant (Proctor & Gamble, Cincinnati, OH) | 1.00 |
|  | 100.00 |

*raw material particle size
**resin viscosity

The mulled mixture was then extruded through a 200 cpsi die to obtain a honeycomb structure having a 2.5 cm diameter and 30 cm length. The honeycomb shaped green structure was then dried at 90° C. for a period of 2 hours and then heated to 150° C. to fully cure the phenole resin. The cured honeycomb was very strong and rigid and exhibited a strength of in excess of 10 ksi. The cured structure was thereafter heated to 900° C. for a period of 2 hours in a nitrogen atmosphere to convert the resin to carbon. Finally, the carbonized honeycomb structure was then heated, in a vacuum, to a temperature of 1500° C. for one hour and thereafter cooled to room temperature.

Figure 3:
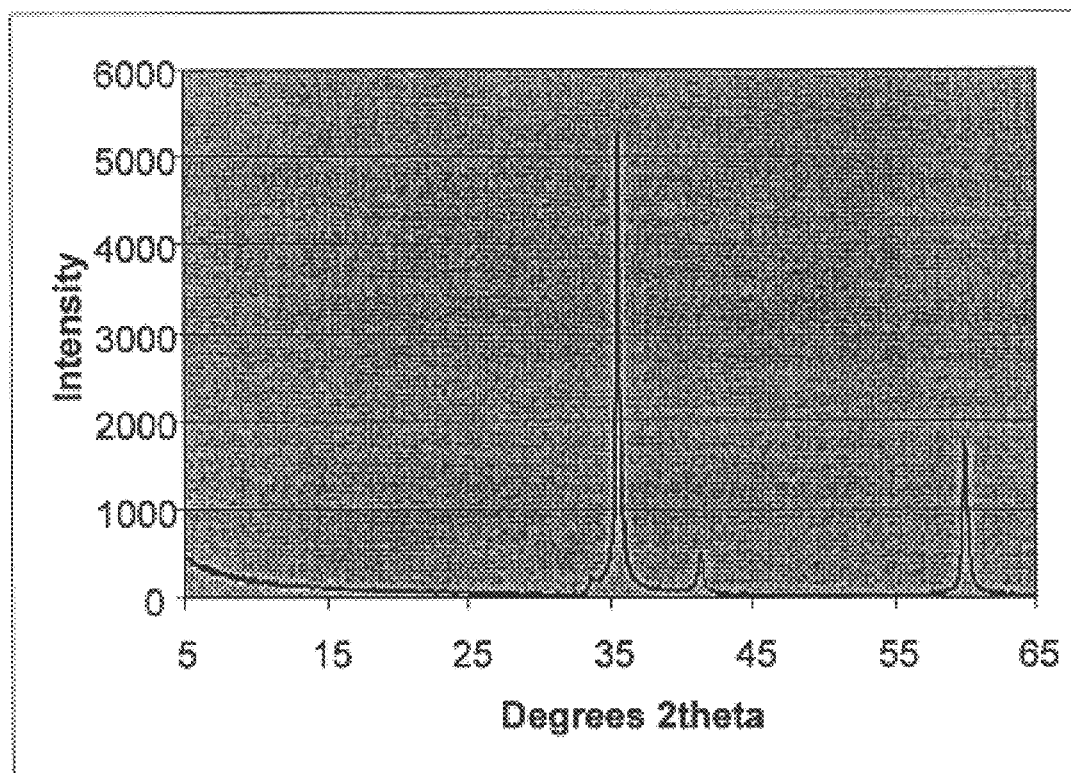
FIG. 3 is a plot of the data of the X-ray analysis of the so-formed SiC honeycomb structure of Example 1.

The so-formed SiC honeycomb structure was very strong, rigid and had the characteristic greenish color of silicon carbide. Properties exhibited by the fully sintered SiC honeycomb structure were as follows: 1) a microstructure comprising a 100% silicon carbide structure, with no trace of residual silicon or any other phase (an examination of the FIG. 3 X-ray plot reveals a nearly complete conversion to Silicon carbide for the so-formed honeycomb structure); 2) a crush strength of about 12 ksi.

Example 2

A plasticizable raw material batch mixture containing the following raw materials was mixed and mulled together with a 6%, by weight, superaddition of water:

| Component | Weight Percent |
|---|---|
| Powdered crystalline silicon-4.9 μm* (Alpha Aesar, Ward Hill, Ma) | 28.5269 |
| Phenolic resole liquid resin-137 cp** (Georgia Pacific); | 30.5269 |
| Silicon carbide powder-0.6 μm* (Superior Graphite, Chicago, Ill) | 25.00 |
| BH40 cotton fiber filler | 8.9475 |
| Methylcellulose binder (Methocel A4M, Dow Chemical, Midland MI) | 6.00 |
| SAN Lubricant (Proctor & Gamble, Cincinnati, OH) | 1.00 |
|  | 100.00 |

*raw material particle size
**resin viscosity

The process of example 1 was followed to form a sintered SiC honeycomb structure. As for Example 1, the so-formed SiC honeycomb structure was very strong, rigid and had the characteristic greenish color of silicon carbide. Properties exhibited by the fully sintered SiC honeycomb structure were as follows: (1) a crush strength 10 Ksi; (2) X-ray data indicated complete conversion to silicon carbide, like Example 1 with no residual phases present.

Example 3

A plasticizable raw material batch mixture containing the following raw materials was mixed with a 7%, superaddition by weight, water and thereafter mulled together:

| Component | Weight Percent |
|---|---|
| Powdered crystalline silicon-4.9 μm* (Alpha Aesar, Ward Hill, Ma) | 26.10 |
| Phenolic resole liquid resin-137 cp** (Georgia Pacific) | 28.00 |
| Silicon carbide powder-0.6 μm* (Superior Graphite, Chicago, Ill) | 30.00 |
| Cellulose fiber (International Filler Corp., N. Tonawanda, NY) | 8.90 |
| Methylcellulose binder (Methocel A4M, Dow Chemical, Midland, MI) | 6.00 |
| SAN Lubricant (Proctor & Gamble, Cincinnati, OH) | 1.00 |
|  | 100.00 |

*raw material particle size
**resin viscosity

The mulled mixture was then extruded through a die to form a 200 cpsi honeycomb structure exhibiting a wall thickness of 20 mil. The honeycomb shaped green structure was then dried at 90° C. for a period of 2 hours and then heated to 150° C. to fully cure the phenole resin; resulting in the crosslinking of the resin and stiffening of the structure. The cured honeycomb was very strong and rigid and could be easily cut, cored drilled and handled without sufficient breakage problems. The crush strength of the honeycomb was about 10 Ksi. The cured structure was heated to 900° C., in a nitrogen atmosphere, for a period of 3 hours to convert the resin to carbon; i.e., carbonize the resin. Finally, the carbonized honeycomb structure was then heated, in a vacuum, to a temperature of 1500° C. for one hour and thereafter cooled to room temperature.

As was the case for Examples 1 and 2, a very strong and hard silicon carbide honeycomb, exhibiting a uniform wall structure, was obtained. Properties exhibited by the fully sintered SiC honeycomb structure were similar to that reported in example 1 and 2.

Example 4

A plasticizable, extrudable raw material batch mixture containing the following raw materials was mixed with an 11.7%, by weight, superaddition of water and thereafter mulled together:

| Component | Weight Percent |
|---|---|
| Powdered crystalline silicon-4.9 μm* (Alpha Aesar, Ward Hill, Ma) | 23.70 |
| Phenolic resole liquid resin-137 cp** (Georgia Pacific); | 25.40 |
| Silicon carbide powder-0.6 μm* (Superior Graphite, Chicago, Ill) | 15.00 |
| Graphite Powder-200 mesh | 20.00 |
| Cellulose fiber (International Filler Corp., N. Tonawanda, NY) | 8.90 |
| Methylcellulose binder (Methocel A4M, Dow Chemical, Midland, MI) | 6.00 |
| SAN Lubricant | 1.00 |
| (Proctor & Gamble, Cincinnati, OH) | |
| | 100.00 |

*raw material particle size
**resin viscosity

This batch was extruded, dried, cured, carbonized and fired at 1500° C. in a similar manner as that described for Example 3. The so-formed silicon carbide honeycomb structure was thereafter fired, in air at a temperature of 800° C. to burn out the graphite, to obtain a SiC honeycomb structure exhibiting generally, uniform porosity, walls and exhibiting good strength. The strength of the honeycomb was about 5 Ksi, slightly lower than the ones obtained in examples 1, 2 and 3.

Example 5

A plasticizable, extrudable raw material batch mixture containing the following raw materials was mixed with a 12.5%, by weight, superaddition of water and thereafter mulled together:

| Component | Weight Percent |
|---|---|
| Powdered crystalline silicon-4.9 μm* (Alpha Aesar, Ward Hill, Ma) | 22.1 |
| Phenolic resole liquid resin-137 cp** (Georgia Pacific); | 23.9 |
| Silicon carbide powder-0.6 μm* (Superior Graphite, Chicago, Ill) | 5.00 |
| Powdered silicon nitride-1 μm* (Alfa-Aesar, Ward Hill, MA) | 15.00 |
| Acrylic Beads-60 μm* (ICI Acrylics, Wilmington, DE) | 20.00 |
| Cellulose fiber, BH-40 (International Filler Corp., N. Tonawanda, NY) | 7.00 |
| Methylcellulose binder (Methocel A4M, Dow Chemical, Midland, MI) | 6.00 |
| SAN Lubricant | 1.00 |
| (Proctor & Gamble, Cincinnati, OH) | |
| | 100.00 |

*raw material particle size
**resin viscosity

This batch was extruded, dried, cured, carbonized and fired at 1500° C. in a similar manner as that described for Example 3, to obtain a strong porous SiC/Si$_3$N$_4$ composite honeycomb structure.

Example 6

A plasticizable, extrudable raw material batch mixture containing the following raw materials was mixed with an 11.0%, by weight, superaddition of water and thereafter mulled together:

| Component | Weight Percent |
|---|---|
| Powdered crystalline silicon, 4.9 μm* (Alpha Aesar, Ward Hill, Ma) | 17.5 |
| Phenolic resole liquid resin-137 cp** (Georgia Pacific); | 19.0 |
| Silicon carbide powder, 10.0 μm* (Exolon ESK, Tonawanda, NY) | 50.00 |
| Cellulose fiber, BH-40 (International Filler Corp., N. Tonawanda, NY) | 5.00 |
| Methylcellulose binder (Methocel A4M, Dow Chemical, Midland, MI) | 7.50 |
| SAN Lubricant | 1.00 |
| (Proctor & Gamble, Cincinnati, OH) | |
| | 100.00 |

*raw material particle size
**resin viscosity

This batch was extruded, dried, cured, carbonized and fired at 1500° C. in a similar manner as that described for Examples 1 and 2. A honeycomb comprising dimensions, as described earlier was formed. The so-formed sintered SiC honeycomb structure exhibited a porosity of about 48% with the pore averaging about 5 micron in size, and a crush strength of about 10 ksi similar to that exhibited by the earlier examples.

This example demonstrates that a high percentage of silicon carbide powder exhibiting a relatively large particle size may be used in the raw material batch in the process of fabricating honeycombs.

Example 7

A plasticizable, extrudable raw material batch mixture containing the following raw materials was mixed with a 10.0%, by weight, superaddition of water and thereafter mulled together:

| Component | Weight Percent |
|---|---|
| Powdered crystalline silicon, 4.9 μm* (Alpha Aesar, Ward Hill, Ma) | 20.20 |
| Phenolic resole liquid resin-137 cp** (Georgia Pacific); | 21.80 |
| Silicon carbide powder, 10.0 μm* (Exolon ESK, Tonawanda, NY) | 35.00 |
| Polyethelene Beads-10 μm* (Quantum Chemical Corporation, USI Division, Cincinnati, OH) | 20.00 |
| Cellulose fiber, BH-40 (International Filler Corp., N. Tonawanda, NY) | 5.00 |
| B$_2$O$_3$ Sintering Aid | 1.00 |
| Methylcellulose binder (Methocel A4M, Dow Chemical, Midland, MI) | 7.00 |
| SAN Lubricant | 1.00 |
| (Proctor & Gamble, Cincinnati, OH) | |
| | 100.00 |

*raw material particle size
**resin viscosity

This batch was extruded, dried, cured, carbonized and fired at 1500° C. in a similar manner as that described for Examples 1 and 2. A honeycomb as described earlier was formed; the so-formed honeycomb exhibited a porosity of about 58% and a crush strength of 8 ksi.

This example demonstrates that both polymer beads, as pore formers, and traditional sintering aids such as B$_2$O$_3$ may be used in the extrusion batch.

Comparison Example 1

Example 3 was substantially repeated, with the exception that the crystalline silicon powder was replaced with an amorphous silicon powder in the batch mixture. After mixing of the batch materials, foaming occurred, likely due to the interaction of the silicon with the aqueous phenolic resin. The mixture was allowed to stand till the foaming reaction was minimized, and the mixture was thereafter extruded as above.

Following extrusion, the green body was dried in a manner as described above. During this drying step, however, this green structure again exhibited periods of foaming resulting in a dried honeycomb body possessing undesirable non-uniformity in the honeycomb body cell walls.

Comparison Example 2

Figure 4:
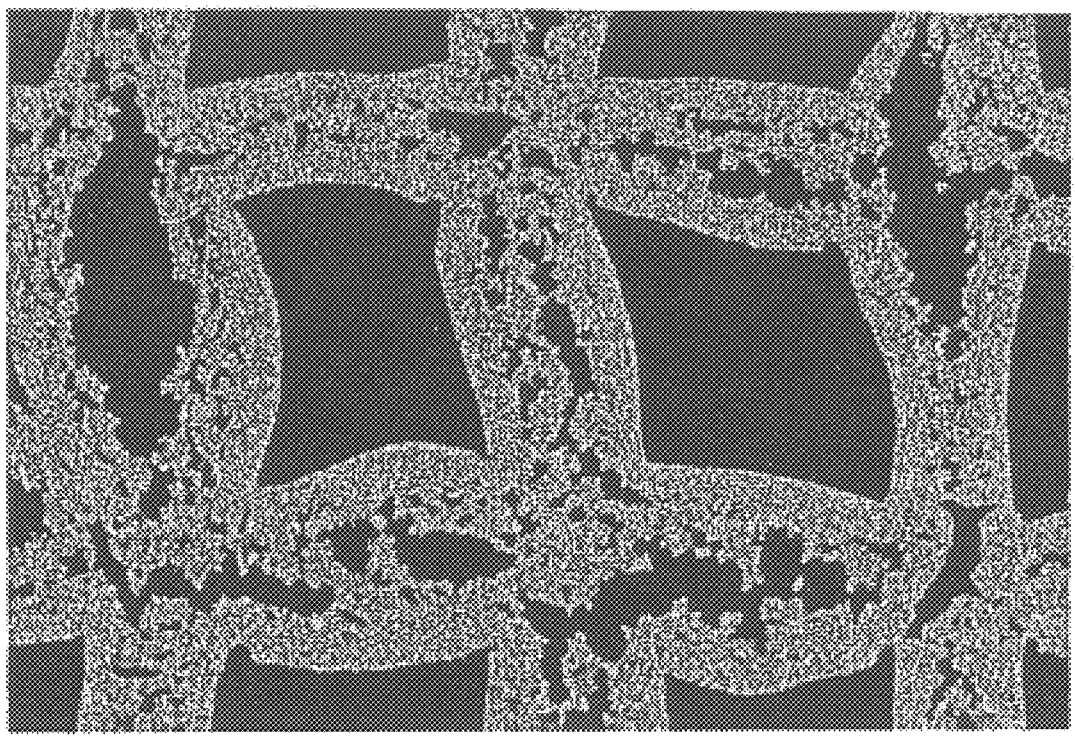
FIG. 4 is a scanning electromicrograph taken at 25× of the sintered silicon carbide structure formed using a phenolic resin exhibiting a viscosity of 2500 cp as detailed in Comparison Example 3.

Example 3 was substantially repeated, with the exception that the phenolic resin utilized exhibited a viscosity of 2501 cp. The resultant SiC honeycomb structure exhibited severely distorted and split cell walls following the curing step; FIG. 4 is an SEM photograph taken at 25× of the walls of the so-formed honeycomb structure. The conclusion that can be drawn from this example is that for successful extrusion/fabrication of SiC honeycombs according to the inventive process, the resin utilized in the inventive process should exhibit a viscosity of below about 1000 cp, preferably 500 cp.

Comparison Example 3

A plasticizable, extrudable raw material batch mixture containing the following raw materials was mixed with both 12.5 and 15%, by weight, superadditions of water and thereafter mulled together:

| Component | Weight Percent |
| --- | --- |
| Powdered silicon-10 μm* (Alpha Aesar, Ward Hill, Ma) | 3.9 |
| Boron carbide powder 1–7 μm* (Alpha Aesar, Ward Hill, Ma) | 0.25 |
| Silicon carbide powder, −325 mesh* (Superior Graphite, Chicago, Ill) | 19.75 |
| Modified starch | 76.1 |
|  | 100.00 |

*raw material particle size
**resin viscosity

Both batch mixtures were capable of being mixed well together, however attempts to extrude honeycomb structures from either of the batches, in a manner as described above, failed as the honeycomb body disintegrated upon exiting the die.

Comparison Example 4

Comparison Example 3 was substantially repeated, with the exception that 6%, by weight, methyl cellulose binder and 1%, by weight SAN lubricant was added to the batch mixture. After mixing of the batch materials, the mixture was thereafter extruded as above; the resultant honeycomb was very fragile. Following extrusion, the green body was dried and subsequently carbonized at a temperature of 900° C. The dried and carbonized body was then fired in an Argon atmosphere at a temperature of 1500° C. whereupon the honeycomb body completely disintegrated into a fine powder.

It should be understood that while the present invention has been described in detail with respect to certain illustrative and specific embodiments thereof, it should not be considered limited to such, as numerous modifications are possible without departing from the broad spirit and scope of the present invention as defined in the appended claims.

We claim:

1. A process for forming a porous silicon carbide sintered body comprising:
   (a) selecting raw materials to form a plasticizable raw material batch mixture comprising:
      (i) about 10–40%, by weight, powdered silicon metal,
      (ii) about 10–40%, by weight, of a water-soluble crosslinking thermoset resin having a viscosity of less than about 1000 centipoise (cp),
      (iii) up to 60%, by weight, of a powdered silicon-containing filler,
      (iv) about 1–10%, by weight of a water soluble thermoplastic temporary binder; and
      (v) a superaddition of 5–25%, by weight, of water;
   (b) shaping the batch mixture to from a green body;
   (c) drying the green body;
   (d) heating the green body in an inert gas, vacuum, or nitrogen atmosphere at a temperature sufficient to carbonize the resin; and,
   (e) sintering the green body at a temperature sufficient to convert the green body to a porous silicon carbide sintered body.

2. The process of claim 1 wherein the mixture comprises about 10–60%, by weight, powdered silicon-containing filler and 15–30%, by weight, of the thermoset resin.

3. The process of claim 1 wherein the thermoset resin is a phenolic resin.

4. The process of claim 1 wherein the powdered silicon-containing filler is selected from the group consisting of silicon carbide, silicon nitride, mullite, and mixtures thereof.

5. The process of claim 1 wherein the amount of, and type of thermoset resin is selected such that the batch mixture exhibits a viscosity of between about 50 to 500 centipoise (cp).

6. The process of claim 1 wherein the amount of, and type of thermoset resin is selected such that the batch mixture exhibits carbon to silicon ratio between 1:3 to 1:1.

7. The process of claim 1 wherein the amount of, and type of thermoset resin is selected such that the batch mixture exhibits carbon to silicon ratio 3:7.

8. The process of claim 1 wherein the mixture further comprises up to about 15%, by weight, organic fibrous filler.

9. The process of claim 8 wherein the organic fibrous filler is selected from the group consisting of cotton fiber, cellulose fiber, wood fiber, and crushed nut shells.

10. The process of claim 1 wherein the mixture further comprises pore-forming filler in an amount of up to 20%, by weight.

11. The process of claim 10 wherein the pore-forming filler comprises a graphitic pore-forming filler or thermoplastic pore-forming filler in an amount of up to 20%, by weight.

12. The process of claim 1 wherein the powdered silicon metal is powdered crystalline silicon.

13. The process of claim 1 wherein the silicon carbide comprises alpha silicon carbide or beta silicon carbide, or mixtures thereof.

14. The process of claim 1 wherein the mixture further comprises a lubricant in an amount of between about 0.5–2.0%, by weight.

15. The process of claim 1 wherein the heating step includes heating the green body in a nitrogen atmosphere at a temperature of about 700 to about 1000° C.

16. The process of claim 1 wherein the firing step involves heating to a temperature range of between about 1400 to 1800° C. and the resultant sintered silicon carbide exhibits a cubic crystalline structure.

17. The process of claim 1 wherein the firing step involves heating to a temperature range of between about 1800 to 2400° C. and the resultant sintered silicon carbide exhibits either a rhombic or hexagonal crystalline structure.

18. The process of claim 1 wherein the shaping step involves extrusion through a honeycomb extrusion die to form a honeycomb green body.

19. The process of claim 1 wherein the water-soluble thermoplastic binder is methylcellulose.

* * * * *